United States Patent
Malotky

Patent Number: 5,120,369
Date of Patent: Jun. 9, 1992

[54] HAZARDOUS MATERIAL REMOVAL USING STRIPPABLE COATINGS

[75] Inventor: Lyle O. Malotky, Fort Washington, Md.

[73] Assignee: The United States of America as represented by the Secretary of the Navy, Washington, D.C.

[21] Appl. No.: 370,879

[22] Filed: Apr. 15, 1982

[51] Int. Cl.[5] .................... B08B 7/00; B08B 17/04
[52] U.S. Cl. .......................... 134/4; 134/10; 134/29; 252/DIG. 3; 260/DIG. 31
[58] Field of Search .............. 134/4, 10, 29; 252/DIG. 3; 260/DIG. 31

[56] References Cited

U.S. PATENT DOCUMENTS

| | | | |
|---|---|---|---|
| 2,495,729 | 1/1950 | Hutson et al. | 134/4 |
| 3,063,873 | 11/1962 | Saroyan | 134/4 |
| 3,079,284 | 2/1963 | Boucher et al. | 134/4 |
| 3,404,134 | 10/1968 | Rees | 260/DIG. 31 |
| 3,634,278 | 1/1972 | Wolverton | 134/29 X |
| 4,053,666 | 10/1977 | Taylor et al. | 134/10 X |

Primary Examiner—Richard D. Lovering
Attorney, Agent, or Firm—Kenneth E. Walden

[57] ABSTRACT

A novel method and process for applying a tailor-made polymer film system to a metal surface for the purpose of immobilizing and decontaminating hazardous chemicals from the said surface using a polymer that will take up the undesirable materials by solution, absorption adsorbtion and hold such undesirable materials in solid suspension with subsequent stripping of the polymeric material.

Therefore the inventive steps in the novel method of this invention comprise: (1) the selection of a tailor-made polymer, preferably one that is capable of being cross linked (2) applying by conventional spraying, brushing or other coating mechanisms the polymer in solution or suspension to a surface or a metal surface that has been painted (3) causing the coating to come in contact with a toxic chemical material be for stripping the coating from the surface by physical means or by the use of a material that causes decrosslinkage and or removal of the polymer at which time the undesirable chemical material is deposited in a safe area.

17 Claims, No Drawings

HAZARDOUS MATERIAL REMOVAL USING STRIPPABLE COATINGS

BACKGROUND OF THE INVENTION

The advent of chemical warfare has made it necessary for the Navy and other U.S. military services to utilize methods to decontaminate surfaces of aircraft, ships and other equipment, particularly the electrical equipment so as to remove strong toxic chemical agents from the surface of equipment. At the present time strong chemical agents are removed, when it is possible to remove them from painted metal surfaces and bare metal surfaces commonly in use in the Navy and in other U.S. service equipment by physical washing or by hydrolyzing, oxidizing, or breaking up the molecules of toxic or hazardous material. The molecular degradation technique is accomplished by using very strong chemicals that also attack the surfaces on which the toxic materials reside. Many strong caustic materials such as sodium hydroxide, calcium hypochloride, or strong solvents and other related chemical decontamination agents well known in the art have been used. The use of any of these strong decontamination agents results in corrosion, stress cracking, paint degradation and in general deterioration of the surface. Some of these strong decontamination chemicals have a short useful life and must be mixed immediately prior to use to use in achieving maximum efficiency In the prior art, methods of decontamination and cleaning surfaces to remove toxic chemical materials use mechanical agitation where abrasion must take place in order to assure intimate contact between the chemicals to insure decontamination. In addition a great deal of close manual supervision is required in close proximity to the contaminated surface. In the process of decontamination personnel usually wear and in fact must wear protective suits and closed air breathing equipment to assure adequate personnel protection. Even so there is considerable hazard to personnel in the decontamination of chemical agents from the surfaces of military equipment.

Therefore it should be clear that chemical warfare agents that are present on the surface of military hardware pose a serious threat to the safety of personnel who must operate, service or otherwise have contact with or be in the vicinity of the equipment. These warfare agents may come from a variety of sources such as from accidents, overspray, testing, or from actual attack by adversaries.

Therefore it should be apparent to one skilled in the art that immediate utilization and rapid turn around of military aircraft and mechanical equipment that may have been contaminated by chemical agents particularly chemical warfare agents is desirable.

The method and processes of this invention allows the use of a strippable polymer film to immobilize and absorb chemical agent this immobilization absorption and cleaning away of the agent allows and permits the use of contaminated equipment for example an airplane that has been sprayed with a chemical warfare agent. In the process the aircraft maybe used in a contaminated state when treated with the crosslinked solid polymer coating of this invention and at some later date the polymer film containing the chemical warfare agent can be removed from the aircraft and disposed of. Unlike the prior art methods of removing toxic chemical agents from equipment surfaces there is no need for the use of mechanical agitation or abrasion.

SUMMARY OF THE INVENTION

The invention is a process or method of absorbing or dissolving a chemical agent into a polymeric film. One of the first steps is to make a polymer film system that is applied to a metal surface for the purpose of immobilizing, decontaminating and removing hazardous chemicals, including chemical warfare agents. The polymer used may be cross linked to form a solid film or coating that is predesigned to have a solubility parameter that is close in numerical value to the solubility parameter of the chemical agent to be absorbed or dissolved out of the metal surface of the contaminated equipment or absorbed or dissolved out of the paint covering the metal surface of the contaminated equipment.

It is one important aspect of the invention that the solid polymer system be precipitated onto the surface to be cleaned so that the polymer coating tightly adheres to the surface to be cleaned and decontaminated, so that intimate contact occurs allowing for substantial absorption and/or dissolution of the toxic chemical agent.

In a subsequent step the solid polymer, containing the toxic chemical agent maybe liquified, solubilized or decrosslinked by the use of a satisfactory monovalent anion in water or organic solvent solution. This step may be practiced in such a manner that the sacrificial coating may be disposed of safely.

OBJECTS OF THE INVENTION

In view of the background of the invention and the summary of the invention as set forth herein one principal object of the invention is to provide a sacrificial strippable coating of a polymeric material that selectively absorbs and dissolves a toxic chemical agent.

One additional object of the invention is to provide a method to decontaminate a surface preferably a metallic surface that may be painted.

It is still a further object of the invention to provide a method for the decontamination of aircraft services and electronic equipment surfaces that can not otherwise be cleaned or decontaminated because in the prior art caustic or corrosive chemicals have been required to perform a satisfactory decontamination. These chemicals destroy, weaken or will render the equipment inoperative.

It is one additional object of the invention to provide a method and process for decontamination of a metallic surface wherein mechanical agitation is eliminated or minimized during the cleaning and decontamination steps.

It is also one important object of the invention to provide a method and process for immobilizing toxic or hazardous chemicals so as to simplify and make more economical in terms of money and manpower, their removal from hardware resulting in the safe disposal of the chemicals and toxic materials.

It is an additional object of the invention to provide a method of reducing the rate of volatilization of toxic chemicals from surfaces.

DETAILED DESCRIPTION OF THE PREFERRED EMBODIMENT

In the practice of the invention one of the most important early steps is the selection of a polymer preferably polymer that is capable of being crosslinked at a subsequent step. In order to properly select the polymer that will give the maximum solution or otherwise absorb and blot up and clean up chemical agent it is necessary to determine the relative solubility parameter of the agent and the polymer.

The following simple formula and simplified equation which can be used to predict the range of Hildebrand solubility parameter $\delta_1$ for solvents with molar volumes $V_1$ that will dissolve polymers with solubility parameter $\delta_2$ at an absolute temperature T was developed by Morawetz.

$$V_1(\delta_2-\delta_1)^2 = RT/2$$

This equation allows the calculation of the solubility parameter range for polymers which will be dissolved by chemical agents. The smaller the difference in solubility parameters the greater will be the Enthalpic driving force for solubility.

If the polymer agent system has an excess of polymer, The vapor pressure of the agent over the polymer will be reduced. The vapor pressure of a volatile solvent over a crosslinked polymer is proportional to the extent of equilibrium swelling. As applied the sacrificial coating reduces the rate of volatilization of the agent from the surface 80 to 100%.

Table 1 shows the range of polymer solubility parameters applicable as good coatings for the removal of the representative agents of interest.

TABLE 1

| RANGE OF POLYMER SOLUBILITY PARAMETERS | | | | |
|---|---|---|---|---|
| AGENT | MOLAR VOLUME | $_1$HILDEBRAND* | POLYMER | $_2$** |
| GD | 178.0 | 8.4 | 7.1 | 9.6 |
| VX | 264.0 | 8.0 | 7.0 | 9.0 |
| HD | 125.4 | 9.7 | 8.2 | 11.1 |

*DPG TR125A, 1977 BAGLEY
**0° C. CALCULATION TEMPERATURE

TABLE 2

| INDUSTRIAL POLYMER SAMPLES | | | | | |
|---|---|---|---|---|---|
| Material | Supplier | Composition | Solids | PH | VISCOSITY (cps) |
| Carboset 514 H | B. F. Goodrich | alkali-soluble acrylic | 40 | 6.7-7.3 | 350 |
| Scripset 700 | Monsanto | styrene-maleic anhydride | 30 | 7.5 | — |
| Scripset 720 | Monsanto | styrene-maleic anhydride | 25 | 8.0 | — |
| Scripset 540 | Monsanto | styrene-maleic anhydride | 100 | — | — |
| Scripset 550 | Monsanto | styrene-maleic | 100 | — | — |
| Versa-TL 125 | National Starch and Chemical | sodium polystyrene sulfonate | 30 | — | — |
| Versa-TL 500 | National Starch and Chemical | sodium polystyrene sulfonate | 100 | 4.0-8.0 | — |

*As aqueous solutions and/or suspensions

Any polymer having the following characteristics can be used in the practice a. The polymer structure is selected so that the hazardous chemical will preferentially reside in the polymer film instead of: (1) on the surface that is to be decontaminated or cleaned; or (2) inside of the paint on the surface.

b. The polymer is capable of being suspended as an emulsion or dissolved in a solvent so that it can be easily applied by conventional techniques of spraying or brushing that are normally used for applying paints or coatings.

c. A crosslinking compound is available that will precipitate the polymer on to the surface to be decontaminated or cleaned.

d. That the crosslinked polymer will tightly adhere to the surface to be cleaned or decontaminated so that intimate contact occurs and the polymer will not fall off during ordinary handling.

e. That the polymer system can be easily decrosslinked preferably by a specific monovalent anion in water or organic solvent solution.

f. The resultant polymer film can be easily stripped and safely disposed of.

The specific polymers described in Table 2 are illustrative of those polymers that give good results.

A film forming polymer system which is not crosslinked but which meets the above criteria and is readily removed may also be used to perform this invention. Weather resistance will be reduced.

CROSSLINKING

Any one of a number of well known crosslinking agents can be used. A preferred crosslinking agent is 2-amino-2-hydroxymethyl-1,3-propanediol (also called TRIS). Another of the preferred crosslinking agents is a zinc containing complex.

EXAMPLE I

Chemical-agent work was done to demonstrate the effectiveness of the coating in removing hazardous materials from painted surfaces. Aluminum panels were primed as required by military specification and then painted with either alkyd or polyurethane top coats. Agent analysis was performed on the vapor evolved before and after the coating application, on the solution containing the stripped sacrificial coating, and on the chloroform solution used to remove the paint and residual agent from the panel.

The polymer used in this example has BF Goodrich Carboset 514 H crosslinked with a zinc complex composed of zinc oxide, ammonium carbonate, ammonia, and water. Water was added to reduce the viscosity to allow spraying of the coating about 100-200 cps. The strippable coating was applied in the range of 3 to 20 g/m² solid weight. The chemical agent was applied at about 6 g/m². The results obtained with Soman (GD) are similar for thickened and heat agent. Because of the agent's high volatility, the sacrificial coating was applied immediately after the agent. Upon application of the coating, by spraying the agent vapor concentration was reduced 50 to 90 percent. After the coating had dried for one hour the GD vapor concentration was reduced 80 to 100 percent. Better than 99 percent of the GD was removed from the polyurethane paint. Typically, 80 percent of the GD was removed from the alkyd paint. Stripping of the panels was done with a 5 percent Alconox in water solution. The low volatility of VX under the experimental consitions reduced to near zero after the application of the sacrificial coating. From 92 to 95 percent of the VX was removed from the polyurethane paint by the sacrificial coating; 75 percent was removed from the alkyd paint. To compare system effectiveness with conventional scrubbing, a series of alkyd-coated panels were treated with VX, allowed to stand for 1 hour, and then washed with Alconox. Approximately 50 percent of the agent was removed by surface washing. The panels were then treated with the sacrificial coating which removed 50 percent of the remaining agent.

The sacrificial coating was able to reduce the volatility of mustard (which was about 20 percent per hour) by 60 to 90 percent. The sacrificial coating was able to remove 60 to 80 percent of the mustard after it had been allowed 1 hour to penetrate and 1 hour to equilibrate with the sacrificial coating.

The coating may be applied either before or after the aircraft or other hardware is contaminated by the hazardous chemical.

It will be understood that numerous changes and modifications may be made in the subject matter described above without departing from the scope of the invention as defined in the appended claims.

What is claimed is:

1. A method for cleaning and absorbing a hazardous chemical from the outer surface of equipment comprising the steps of:
   (a) providing a tailored polymeric material with a favorable solubility factor;
   (b) mixing the polymeric material with a crosslinking agent which is 2-amino-2-hydroxymethyl-1,3,-propanediol;
   (c) applying the polymeric mixture to the surface to be coated;
   (d) creating conditions that allow crosslinking of the polymeric material;
   (e) forming a solid crosslinked polymer in the said surface that tightly adheres to the surface;
   (f) removing any hazardous chemical from the surface by dissolution or absorption of the chemical agent into the coating; and
   (g) removing the polymeric coating containing the hazardous chemical.

* * * * *

UNITED STATES PATENT OFFICE
CERTIFICATE OF CORRECTION

Patent No. 5,120,369            Dated  June 9, 1992

Inventor(s)  Lyle O. Malotky

It is certified that error appears in the above-identified patent and that said Letters Patent is hereby corrected as shown below:

On the title page, change

"17 claims, No Drawings" to -- One claim, No Drawing --.

Signed and Sealed this

Thirtieth Day of November, 1993

Attest:

Attesting Officer

BRUCE LEHMAN

Commissioner of Patents and Trademarks